United States Patent
Klingman et al.

(10) Patent No.: US 7,539,998 B1
(45) Date of Patent: *May 26, 2009

(54) MECHANISM FOR CONVERTING CORBA OBJECT REQUESTS TO NATIVE XATMI SERVICE REQUESTS

(76) Inventors: Vance Jay Klingman, 3210 Old Highway 8, St. Anthony, MN (US) 55418; Jeremy A. Freed, P.O. Box 791, Francesville, IN (US) 47946

(*) Notice: Subject to any disclaimer, the term of this patent is extended or adjusted under 35 U.S.C. 154(b) by 538 days.

This patent is subject to a terminal disclaimer.

(21) Appl. No.: 10/164,748

(22) Filed: Jun. 6, 2002

(51) Int. Cl.
*G06F 9/44* (2006.01)
*G06F 9/46* (2006.01)
(52) U.S. Cl. ................................ 719/316; 719/330
(58) Field of Classification Search ........... 719/310, 719/315, 316, 330, 313, 314; 707/1, 10; 709/203, 223, 230, 246; 714/19; 717/100, 717/143
See application file for complete search history.

(56) References Cited

U.S. PATENT DOCUMENTS

| | | | | |
|---|---|---|---|---|
| 5,586,312 | A * | 12/1996 | Johnson et al. | 707/10 |
| 5,923,833 | A * | 7/1999 | Freund et al. | 714/19 |
| 5,923,879 | A * | 7/1999 | Sasmazel et al. | 717/143 |
| 6,134,559 | A * | 10/2000 | Brumme et al. | 707/130 R |
| 6,212,546 | B1 * | 4/2001 | Starkovich et al. | 709/203 |
| 6,243,862 | B1 * | 6/2001 | Lebow | 717/131 |
| 6,272,675 | B1 * | 8/2001 | Schrab et al. | 717/100 |
| 6,330,598 | B1 * | 12/2001 | Beckwith et al. | 709/223 |
| 6,782,540 | B1 * | 8/2004 | Chow et al. | 719/316 |
| 6,931,455 | B1 * | 8/2005 | Glass | 719/316 |
| 2003/0023577 | A1 * | 1/2003 | Sundius et al. | 707/1 |
| 2003/0074485 | A1 * | 4/2003 | Zhdankin et al. | 719/316 |
| 2003/0204612 | A1 * | 10/2003 | Warren | 709/230 |
| 2005/0038911 | A1 * | 2/2005 | Watanabe et al. | 709/246 |

OTHER PUBLICATIONS

Baker "CORBA Distributed Objects Using Orbix" 1999, pp. 10-14, 289-292, and 394-398.*
Orfali et al. "Instant CORBA" 1997, pp. 10-17.*
Froidevaux et al., "The Mainframe as a High-Available, Highly Scalable CORBA Platform," 1999, IEEE Computer Society, 7 pages.*

* cited by examiner

*Primary Examiner*—Van H Nguyen
(74) *Attorney, Agent, or Firm*—Charles A. Johnson; Robert P. Marley; Nawrocki, Rooney & Silvertson (57) ABSTRACT

An apparatus for and method of permitting a CORBA user terminal to request services from an enterprise server having XATMI applications. The service request is generated and transmitted in accordance with CORBA protocol as an IIOP message. A CORBA adapter makes the data format conversions. The request is honored by the enterprise server and a response is generated. The response is converted to CORBA protocol and transferred to the user terminal.

8 Claims, 8 Drawing Sheets

CONFIGURATION FILE 148

Input View:

First Four Words = One-word Integerws
  Next Ten Words = ASCII Test

⋮

Last Ten Words = Double-word decimal

MECHANISM FOR CONVERTING CORBA OBJECT REQUESTS TO NATIVE XATMI SERVICE REQUESTS

CROSS REFERENCE TO CO-PENDING APPLICATIONS

The present application is related to U.S. patent application Ser. No. 09/570,701, filed May 15, 2000, entitled "CORBA ACCESS TO SERVICES"; application Ser. No. 10/166,239, filed Jun. 6, 2002, entitled "IMPROVED METHOD AND APPARATUS FOR HONORING CORBA TRANSACTION REQUESTS BY A LEGACY DATA BASE MANAGEMENT SYSTEM", now U.S. Pat. No. 7,376,958; application Ser. No. 10/165,644, filed Jun. 6, 2002, entitled "MECHANISM FOR IMPLEMENTING DIFFERENT TYPES OF SERVICES WITHIN THE SAME TWO-PHASE COMMIT TRANSACTION"; U.S. patent application Ser. No. 09/310,717, filed May 12, 1999, entitled "A GENERIC DCOM SERVER"; U.S. patent application Ser. No. 09/164,932, filed Oct. 1, 1998, entitled "A MULTI-USER CUSTOMIZED DCOM GATEWAY FOR AN OLTP ENTERPRISE SERVER APPLICATION"; U.S. patent application Ser. No. 09/400,647, filed Sep. 21, 1999, entitled "WEBTX MESSAGE QUEUE SYSTEM"; and application Ser. No. 09/164,759, filed Oct. 1, 1998, entitled "A COMMON GATEWAY WHICH ALLOWS APPLETS TO MAKE PROGRAM CALLS TO OLTP APPLICATIONS EXECUTING ON AN ENTERPRISE SERVER", now U.S. Pat. No. 6,397,220, issued on May 28, 2002; which are assigned to the assignee of the present invention and incorporated herein by reference.

BACKGROUND OF THE INVENTION

1. Field of the Invention

The present invention relates to methods and apparatus for facilitating on-line processing requests, and more specifically, to CORBA applications to access existing applications developed using the Extended Application Transaction Module Interface (XATMI) standard.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the prospect of using component software technology—the idea of breaking large, complex software applications into a series of pre-built and easily developed, understood, and changed software modules called components—as a means to deliver software solutions much more quickly and at a lower cost. The goal is to achieve economies of scale for software deployment across the industry.

DCOM is a proprietary technology of Microsoft Corporation and is only applicable to Windows based applications. Therefore, there is a need for a much more generalized and universal component architecture to accommodate a wide range of hardware and operating system platforms. Common Object Request Broker Architecture or "CORBA" is indeed such an approach. CORBA was developed through the efforts of a number of interested companies and agencies. An introduction to the approach may be found at http://www.omg.org Thus, CORBA provides a technique for the development of software systems.

This component architecture for building software applications will enable this by: 1) speeding development—enabling programmers to build solutions faster by assembling software from pre-built parts; 2) lowering integration costs—providing a common set of interfaces for software programs from different vendors means less custom work is required to integrate components into complete solutions; 3) improving deployment flexibility—making it easier to customize a software solution for different areas of a company by simply changing some of the components in the overall application; and 4) lowering maintenance costs—isolating software function into discreet components provides a low-cost, efficient mechanism to upgrade a component without having to retrofit the entire application.

A distributed component architecture applies these benefits across a broader scale of multiuser applications. CORBA has several strengths that make it a key technology for achieving this. CORBA works easily with Internet technologies like TCP/IP, the Java language, and the HTTP network protocol, providing "object glue" that will enable business applications to work across the Web. CORBA is also an open technology that runs on multiple platforms.

CORBA has its roots as an alternative to Microsoft's DCOM object technology, which has evolved over the last decade from DDE (Dynamic Data Exchange, a form of messaging between Windows programs), OLE (Object Linking and Embedding, embedding visual links between programs within an application), COM (the Component Object Model, used as the basis for all object binding), and ActiveX (COM enabled for the Internet). In addition to all of the DCOM capabilities, CORBA is applicable to other non-Windows operating systems. As stated earlier, applications built from components are simply easier to debug and evolve than large, monolithic applications.

The logical boundary for component applications is no longer on a single machine. Businesses want to leverage the benefits of component development across a broader set of shared applications that operate on multiple machines. These types of applications are referred to as "three-tier" or "n-tier" applications, where "tiers" of application logic, presentation services, business services, and information retrieval and management services, are broken into different components that can communicate directly with each other across a network. To the end user, these applications appear as a seamless extension of their existing desktop environment.

The simplicity, ubiquity, and industry momentum of standard Internet protocols like HTTP make it an ideal technology for linking components together for applications that span machine boundaries. HTTP is easy to program, is inherently cross-platform, and supports an accessible, universal naming service. Much of the excitement around the Java language derives from its potential as a mechanism to build distributed component applications on the Internet. In addition to Java support, CORBA enables components written in other languages, including C, COBOL, Basic, and Pascal, to communicate over the Internet, providing a growth path for existing applications to support Web technology.

As distributed component architectures, such as CORBA, are making their mark as a technology that enables software components to communicate directly with each other across networks, many businesses have a wealth of information that is managed by prior art data base management systems such as DMS, RDMS, DB2, Oracle, Ingres, Sybase, Informix, and many others. In addition, many of the database management systems are available as resources in a larger transaction processing system.

One key to the future success of a business may lie in its ability to capitalize on the ability to interconnect a distributed component architecture, such as CORBA, with existing enterprise systems having applications developed in accordance with the XATMI standard. It defeats the two main goals of component-based development, fast time-to-market and lower development costs, if companies are forced to "hand code" into their component applications the mission critical services that are required for online production systems. Therefore, the leading system suppliers have developed commercially available "middleware" to link web based work stations with existing XATMI systems.

However, most existing XATMI systems have been developed under the assumption that user work stations are physically, electrically, and functionally dedicated exclusively to providing communication between the XATMI and a single user during an entire user session period. This assumption arose at a time in which user work stations were simply dumb video display/keyboard devices connected directly to the XATMI mainframe via a dedicated electrical line.

Modern work stations, however, are extremely complex and capable of substantial unassisted data processing. Furthermore, the internet connection between a modern work station and the XATMI enterprise system is anything but physically, electrically, and functionally dedicated exclusively to a single user session.

SUMMARY OF THE INVENTION

The present invention overcomes many of the disadvantages associated with the prior art by providing a method and apparatus for accommodating transaction requests from a web based work station directed to an XATMI enterprise server system through utilization of the CORBA technique. In the preferred mode, the work station is an industry compatible personal computer running a commercially available browser operating under a common operating system which may be Windows or other suitable operating system. The client work station is coupled, via the internet, to a CORBA server adapter. The CORBA interface communicates through middleware. This middleware permits the user work station to communicate with the XATMI enterprise server as with other dedicated user terminals.

The CORBA adapter makes the interface to the client terminal appear as the distributed CORBA architecture. The CORBA adapter interfaces with the gateway which causes the CORBA client terminal appear to be a dedicated user terminal to the OLTP enterprise server. The actual connection is made through normal network facilities.

The gateway provides buffering for the transaction permitting the CORBA client terminal to resume normal activity between transmitting the transaction request and the receipt of the service response. The enterprise sever application also does not need be available at the time of a transaction request. Rather than tie up the user work station until a communication time-out occurs, the user work station can perform other tasks, including making additional transaction requests.

The preferred mode of the present invention provides a way to direct requests from a CORBA client to XATMI services. Because direct communication is possible, performance is improved as compared to systems that utilize gateway servers.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
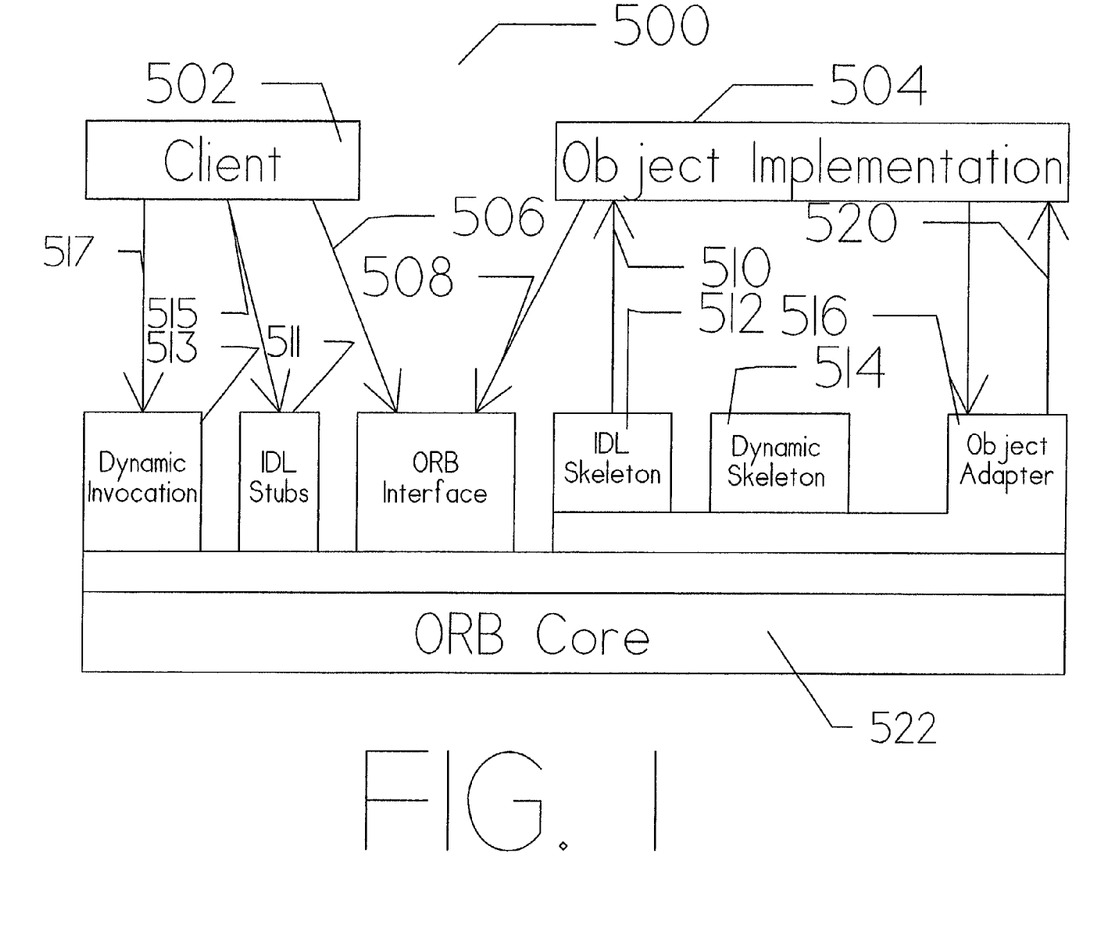
FIG. 1 is a functional block diagram of the Object Request Broker (ORB) of the CORBA computing environment.

FIG. 1 is a functional block diagram of Object Request Broker 500 of the Object Management Group's Common Object Request Broker Architecture (CORBA). The Object Request Broker (ORB) is the central component of the CORBA structure. It contains all of the facilities necessary to identify and locate objects; handle connection management; and deliver data. ORB is responsible for properly transferring all requests.

The basic functionality provided by the ORB consists of passing the request from Client 502 to Object Implementation 504 on which it is invoked. In order to make a request the client can communicate with ORB Core 522 through IDL Stubs 511 or through Dynamic Invocation 513. The stub represents the mapping between the language of implementation of the client and ORB Core 522. Thus the client can be written in any language as long as the implementation of ORB 500 supports this mapping.

ORB Core 522 then transfers the request to Object Implementation 504 which receives the request as an up-call through either IDL Skeleton 512 or Dynamic Skeleton 514. The communication between Object Implementation 504 and ORB Core 522 is effected by Object Adapter 516.

Figure 2:
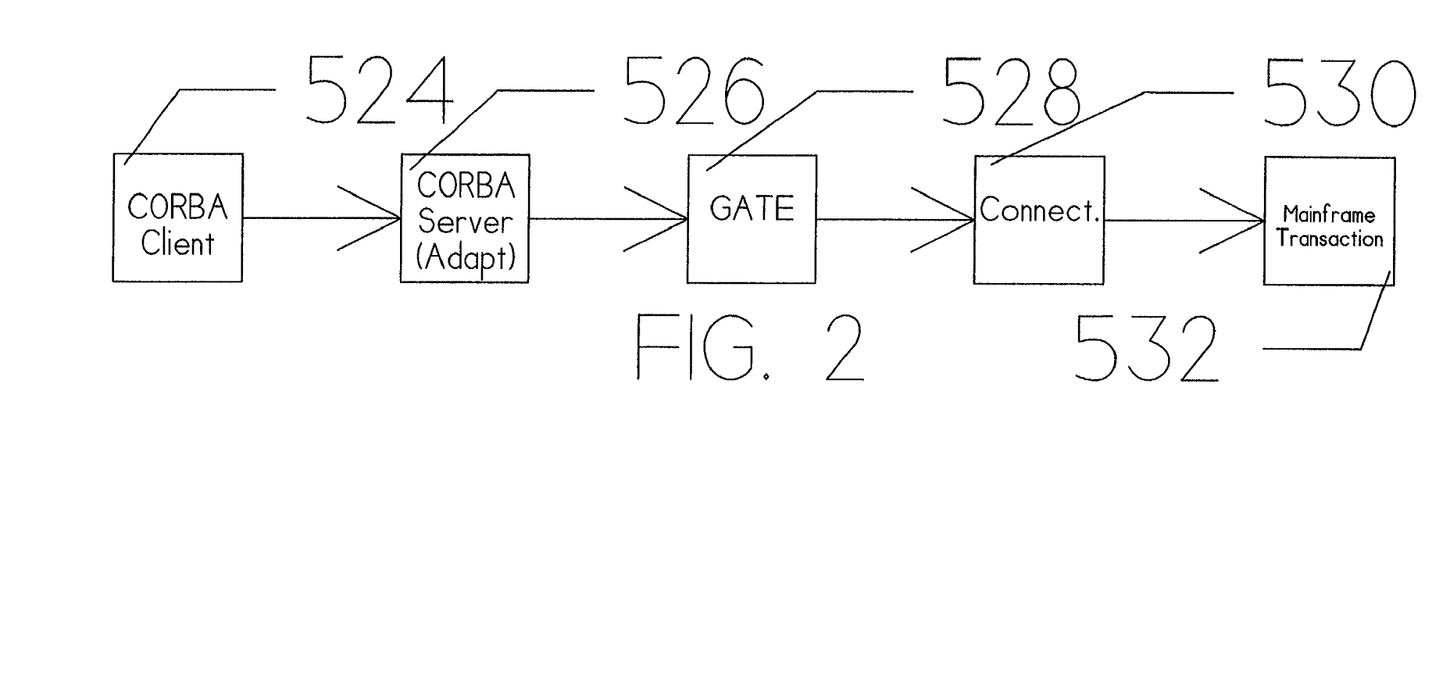
FIG. 2 is a functional block diagram showing the major components of the previous approach.

FIG. 2 is a functional block diagram of the major components of the previous approach to providing CORBA access to XATMI applications. CORBA Client 524 requests a service of the OLTP enterprise server utilizing the CORBA protocol. The request is forwarded to CORBA Server 526 which communicates with CORBA Client 524 in accordance with the CORBA protocol and transfers the request to Gate 528. It is Gate 528 which essentially converts the request from free standing CORBA Client 524 to functionally resemble the dedicated user terminal expected by the OLTP enterprise server.

Gate 528 interfaces with Connector 530 for transmission of the request to Mainframe Transaction 532. Preferably this transfer is in accordance with HTP/ic protocol. Mainframe Transaction 532 processes the request in due course in accordance with its other priorities. The response to the request, if any, is transferred to CORBA Client 524 in the reverse order as available.

Figure 3:
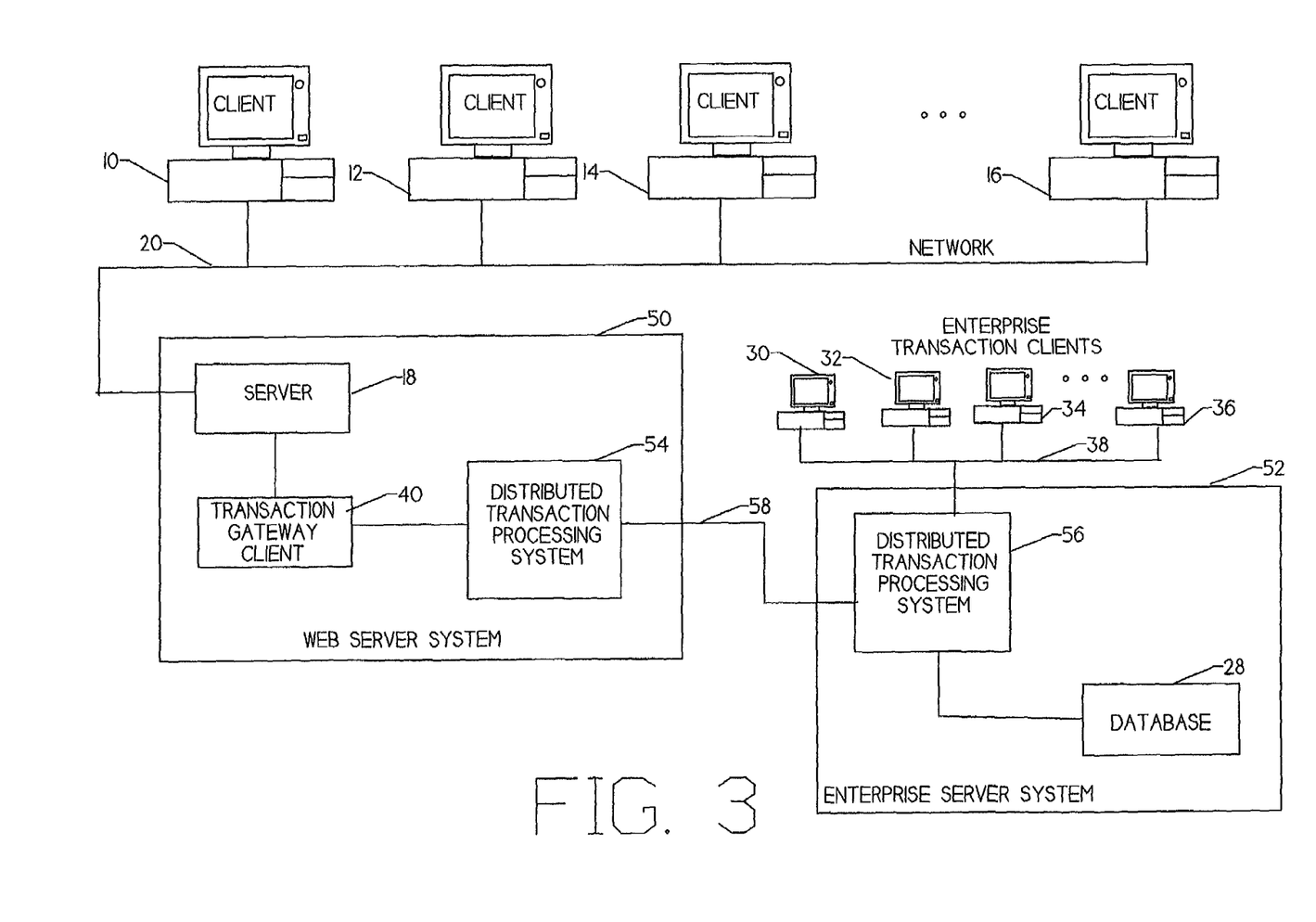
FIG. 3 is a block diagram of a typical hardware/software environment employing the present invention.

FIG. 3 is a functional block diagram of a generalized computing environment in which the present invention could be used to make an enterprise based transaction processing system interoperable with a PC/Workstation based requestor employing the CORBA protocol. A plurality of PC/Workstations, designated as Clients 10, 12, 14, and 16 are coupled to a Server 18 via Network 20. The Network 20 may be an internal local area network or the Internet.

Each of the Clients 10, 12, 14 and 16, is a Personal Computer/Workstation having operating system software and application software designed to provide Graphical User Interface (GUI) and communications capabilities which enable the Client to communicate with an associated Server application 18 via a Network 20. This communication employs the CORBA protocol. Therefore, Clients 10,12,14, and 16 may operate under Windows or any number of other suitable operating systems.

The Workstation Server System 50 may be any class of machine(s) which are capable of running a Server application 18 accommodating CORBA along with a Distributed Transaction Processor 54. The Transaction Processing system 54 is designated as Distributed to make clear that a transaction is formatted on the Workstation Server System 50 and forwarded to the Enterprise Server system 52 for processing. The exemplary Enterprise Server System 52 is a 2200 Series data processing system from Unisys and also includes a Distributed Transaction Processing System 56. The Distributed Transaction Processing System 56 is intended to encompass the same functionality as a monolithic transaction processing system, however, it is designated as Distributed to be compatible with the Distributed Transaction Processing System 54. The exemplary Distributed Transaction Processing Systems 54 and 56 are intended to encompass transaction manager software, such as Open/OLTP Transaction Manager software from Unisys, and user implemented Open/OLTP services. The Distributed Transaction Processing System 54 and the Distributed Transaction Processing System 56 are coupled via Network 58. Preferably, the network interface for Network 58 is separate from the network interface for Network 20.

The Distributed Transaction Processing System 56 serves data from the Database 28 to the Transaction Clients 30,32, 34, and 36. The Transaction Clients 30, 32, 34, and 36 are coupled to the Distributed Transaction Processing System 56 via line 38, of which the underlying technology is driven by the application of the Distributed Transaction Processing System 56.

The Transaction Gateway Client 40 allows the Server 18 to interoperate with the Transaction Processing System. When a Client 10, 12, 14 or 16 selects an enterprise based service, the CORBA request is routed to the Server 18, which in turn routes the request to the Transaction Gateway Client 40. The Transaction Gateway Client 40 determines the requested service and forwards the necessary information to the Distributed Transaction Processing System 54 and 56. The Distributed Transaction Processing System 54 and 56 processes the request against the Database 28 according to the specified request (e.g., select, update, delete). The Distributed Transaction Processing System 54 and 56 returns data and/or status information to the Transaction Gateway Client 40, which in turn formats the data in an appropriate manner for the Server 18. The Server 18 then returns the information to the requesting CORBA Client 10, 12, 14, and 16.

Figure 4:
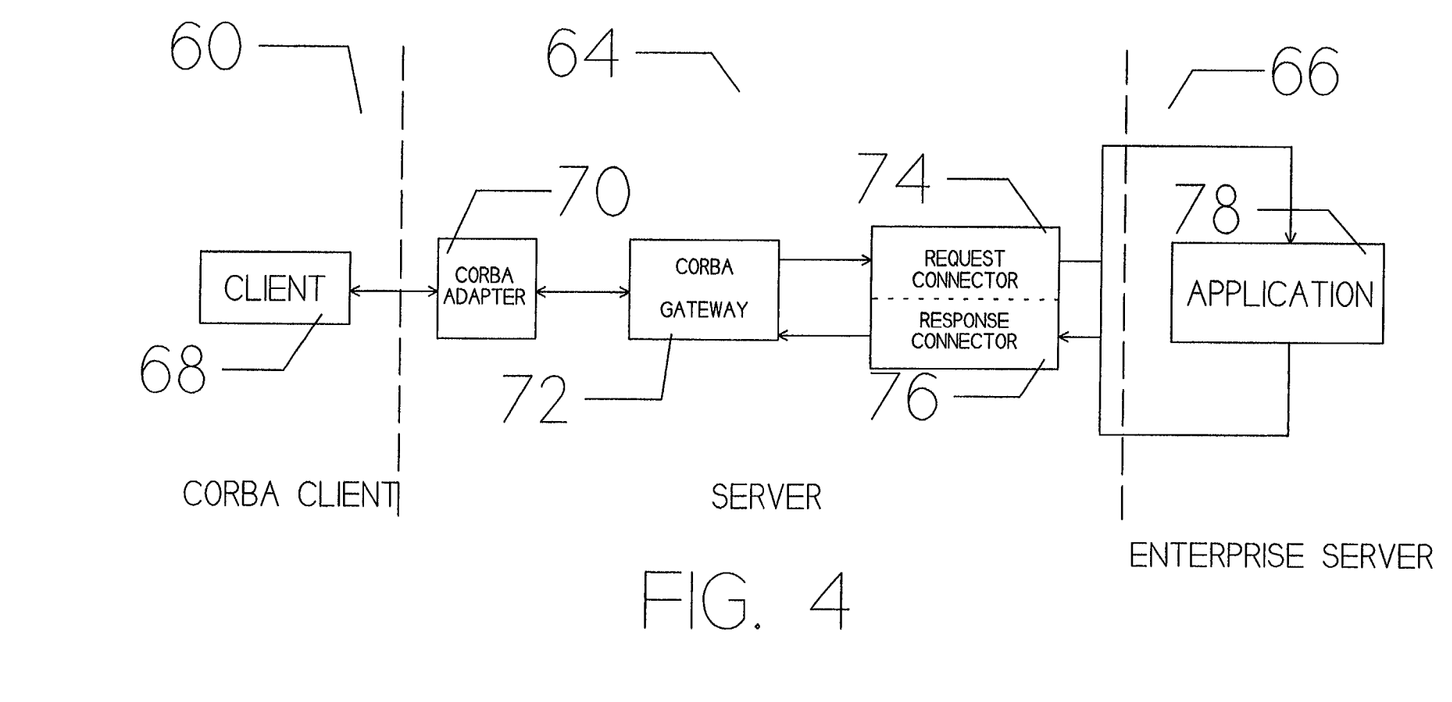
FIG. 4 is a functional block diagram showing data flow of the previous approach.

FIG. 4 is a functional diagram showing data flow through the major components of the previous approach utilizing a CORBA gateway. For explanatory purposes, the system may be divided into three regions. CORBA Client 68 is located within CORBA Client region 60. This represents the user, operating a user terminal, or work station. The user terminal is preferably an industry standard personal computer having a CORBA compatible operating system, which may or may not be Windows based, and a commercially available web browser through which the user communicates with the Server of region 64.

The Server is preferably a CORBA based server having an industry compatible standardized architecture. Hosted on the Server is CORBA Adapter 70. The nature of CORBA Adapter 70 is discussed in greater detail below. However, it permits standardized CORBA based communication from CORBA Client region 60 to couple to existing enterprise server applications.

Necessary to the practice of this approach is CORBA Gateway 72, which provides the logic for formatting and transferring requests from and responses to the CORBA environment. Through this gateway operating with CORBA Adapter 70, the CORBA client can request and receive messages which utilize any CORBA supported format including html, java, c-client, vb-client, etc. The data transfers at this point are in standard view format.

Request Connector path 74 actually transfers the request messages to be made available to Application 78. Application 78 of the enterprise server located in Enterprise Server region 66, transfers response messages to Response Connector path 76 for transmission to Client 68. CORBA Gateway 72 manages the data flow through the single connector consisting of Request Connector path 74 and Response Connector path 76.

When client 68 makes a request, it is transferred using CORBA protocol to CORBA Adapter 70 and transferred for servicing to Application 78 via Request Connector path 74. The response, if any, is transferred from Application 78 via Response Connector 76 path to CORBA Gateway 72. The response is converted to CORBA format and transferred to Client 68 in CORBA protocol by CORBA adapter 70.

Figure 5:
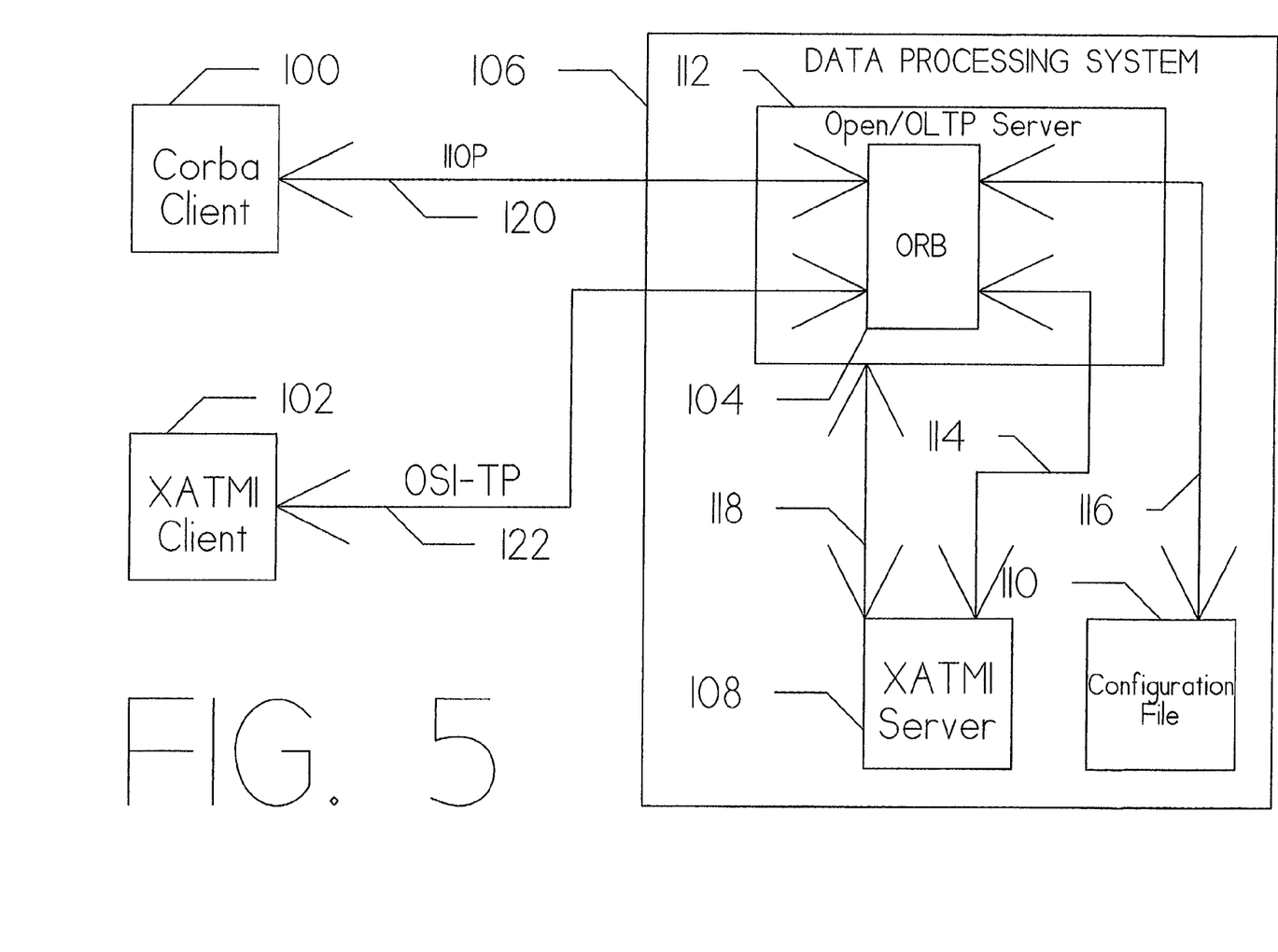
FIG. 5 is a diagram showing the relationship of the key run time software components of the present invention.

FIG. 5 is a system block diagram showing the preferred mode of the present invention. Open/OLTP 112 resides within a data processing system 106, such as a Model 2200 system commercially available from Unisys Corporation. XATMI client 102 calls services within Open/OLTP 112 using standard OSI-TP communication protocol via path 122. These requests are forwarded for processing by XATMI server 108 via path 118. These requests do not require any conversion because they are already in the format used by the XATMI services.

In contrast to XATMI client 102, CORBA client 100 makes requests in Integrated Input Output Protocol (IIOP) using an IIOP communications protocol. These requests cannot be forwarded directly to XAMTI 108 for processing because they are not in the correct format. As explained above, these requests may be intercepted by a CORBA server that reformats the requests into OSI-TP communications protocol to resemble requests from XATMI client 102. However, processing requests in this manner tends to degrade performance.

In accordance within the preferred mode, these requests are forwarded via path 120 directly to CORBA Object Request Broker (ORB) 104 within Open/OLTP server 112. ORB 104 reformats the requests dynamically as the requests are passed to XATMI server 108 via path 114 such that little performance impact is associated with this translation.

Figure 6:
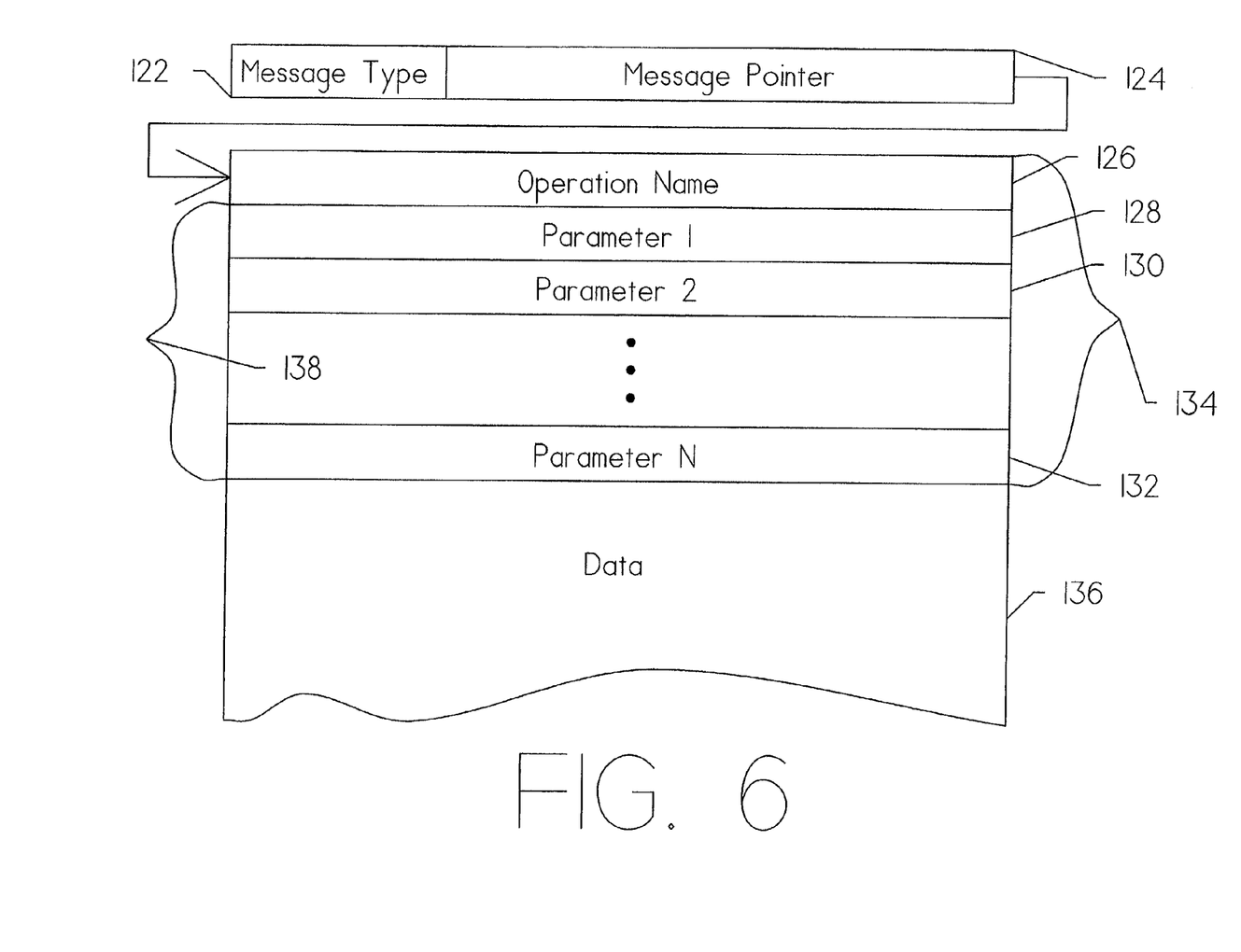
FIG. 6 is a detailed diagram showing an exemplary format of a message from a CORBA client.

FIG. 6 is a detailed diagram showing the format of an exemplary message sent by CORBA client 100. The message includes a message type 122 followed by a message pointer 124. Message pointer 124 points to the start of header area 134. Header area 124 include operation name 126, which defines the operation to be performed by the XATMI server when honoring the request. Parameters 128,130, ..., and 130 are located within parameter area 138. These are utilized in honoring the request. Message data 136 constitutes the actual message.

As discussed above, ORB 104 re-formats the message sent by CORBA client 100 (see also FIG. 5). ORB 104 determines the type of message as indicated by message type 122. If the message was sent by CORBA client 100, this field will indicate the message is in an IIOP communication format. For XATMI client 102, this field will indicate the message is an OSI-TP message. In the current exemplary embodiment, ORB 104 will only receive messages that are IIOP messages. However, in an alternative embodiment, multiple message types can be processed based upon the message type field as read by ORB 104.

After the determination has been made regarding message type, message pointer 124 is used to retrieve header area 134. The operation name is utilized to locate an entry within configuration file 148 (see also FIG. 7B), as explained below. This could be accomplished using a search of any kind, or using some type of indexing mechanism. The located entry identifies both an "input view" 144 (see also FIG. 7A) and an "output view" 146, both of which being explained in greater detail below. A view can be thought of as a translation code that indicates how data is to be formatted for the particular XATMI operation that is to be called.

Figure 7A:
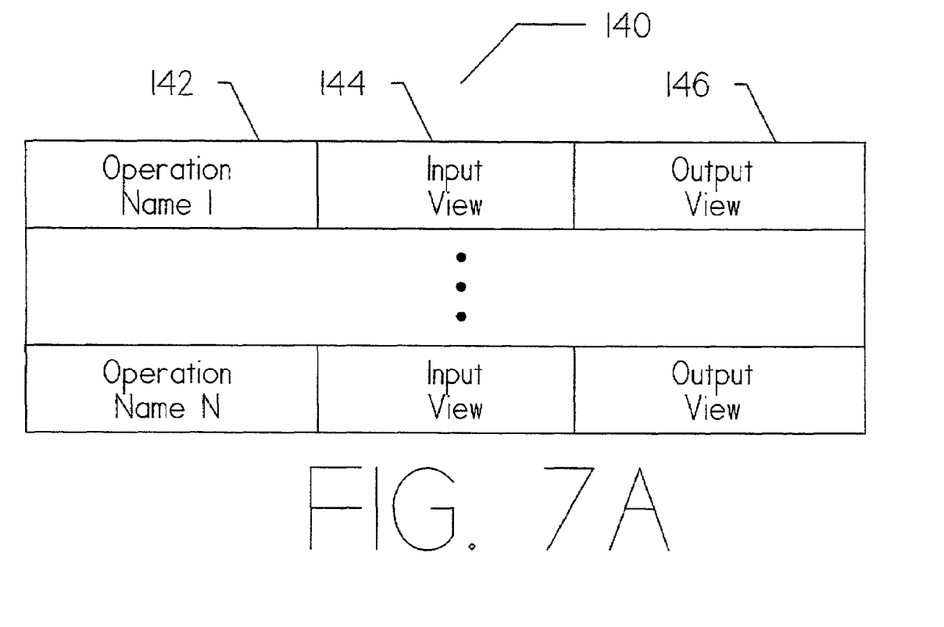
FIG. 7A is a diagram illustrating the header.

FIG. 7A is a diagram of configuration file 140. Each record contains an operation name 142, an input view 144, and an output view 146.

Figure 7B:
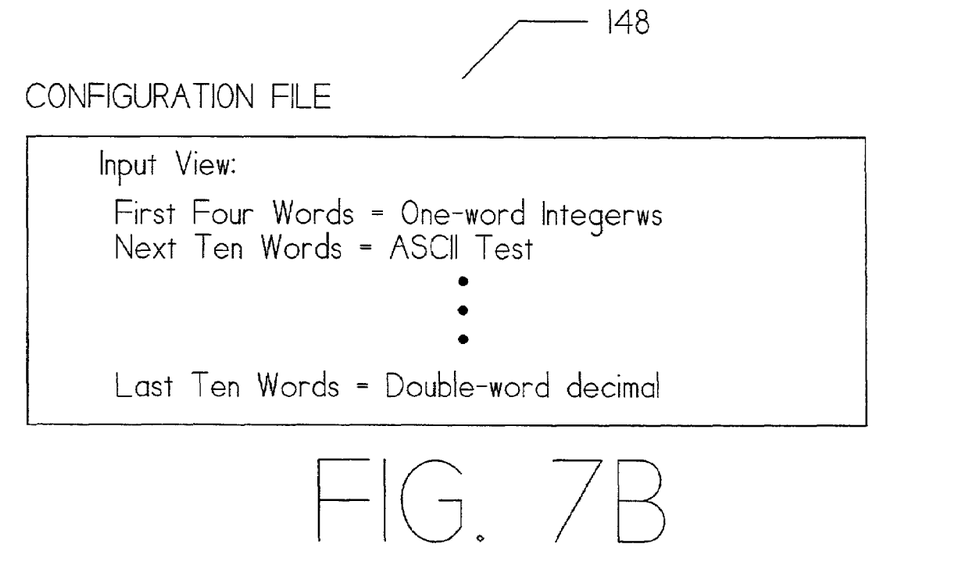
FIG. 7B is a diagram illustrating an exemplary input view.

FIG. 7B is a diagram of an exemplary input view 148. The exemplary view indicates that the first four words of message data are to be provided to XATMI server 108 as one-word integers. The next ten words are then to be provided as ASCII text data, and so on. The view will indicate a format for every word of data that is to be provided to XAMTI server 108. The last ten words are double-word decimals.

After the appropriate view is retrieved, ORB 104 may retrieve data 136 from the message. ORB 104 knows the format of this original data because a known message type 122 was retrieved from the header of the message. ORB 104 also knows how to translate this data because of the translation code provided in the input view. ORB 104 therefore systematically retrieves data 136, performs the required translation, and passes the translation data to XATMI server 108. After all data is received, XATMI server 108 processes the request, and returns any results back to ORB 104.

As noted above, configuration file 140 provides both the input and output views for an operation. The output view is used by ORB 104 to translate the output data provided by XATMI server 108. This is accomplished in a manner similar to that described above with respect to the input view. The translated output data can then be forwarded to CORBA client 100.

The forgoing process is described above using an example where a request from CORBA client 100 is provided to XATMI server 108. However, the same process could be used to dynamically translate a request from any type of server into another format. The translation can be made specific for each operation, and can be changed by altering the view file, or by creating a new view and updating the configuration file. The process is therefore very flexible. Moreover, the translation process is performed without impacting performance, as is the case when an intermediate server performs the translation process.

Figure 8:
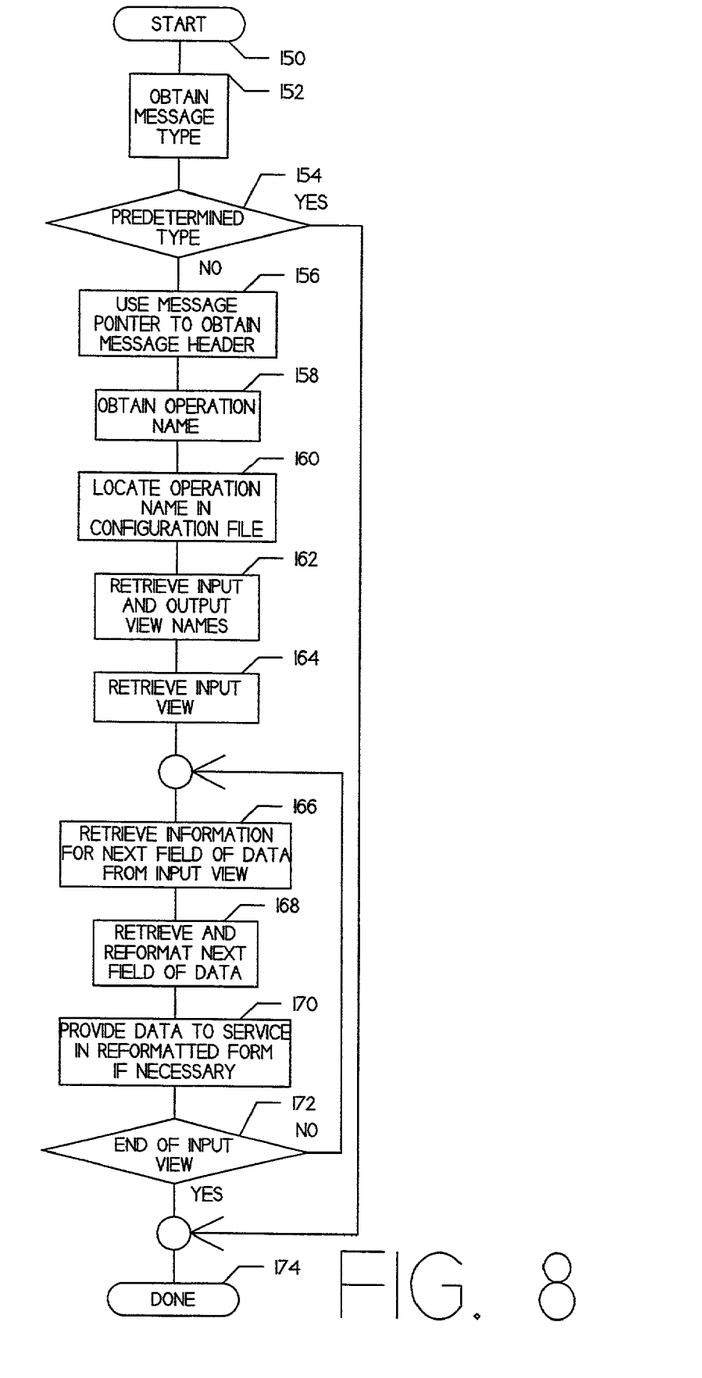
FIG. 8 is a detailed flowchart showing the basic process of the present invention.

FIG. 8 is a detailed flow chart showing the operation of the preferred mode of the present invention. The process begins at element 150. The first step is obtaining the message type as shown at element 152.

Element 154 determines whether it is a predetermined type. If yes, control is given to element 174 for exit. Otherwise control is given to element 156 for access to the message header using he message pointer. Element 158 obtains the operation name from the message header. The operation name is located in the configuration file at element 160.

The input and output view names are retrieved at element 162. Element 164 retrieves the actual input view. Element 166 retrieves the information for the next field of data from the input view. The next field of data is retrieved and reformatted at element 168. The reformatted form of the data is provided to the service by element 170. Element 172 determines whether all of the data from the input view has been reformatter and transferred. If not, control is given to element 166 to continue. Otherwise, control is given to element 174 for exit.

Having thus described the preferred embodiments of the present invention, those of skill in the art will readily appreciate that the teachings found herein may be applied to yet other embodiments within the scope of the claims hereto attached.

We claim:

1. An apparatus having at least one processor for permitting a CORBA (Common Object Request Broker Architecture) user terminal to request services from an enterprise server having XATMI (Extended Application Transaction Module Interface) applications comprising:
   a. a user terminal which generates a service request using CORBA protocol;
   b. a publicly accessible digital data communication network responsively coupled to said user terminal;
   c. a server responsibly coupled to said publicly accessible digital data communication network;
   d. a conversion facility located in said server which converts said CORBA protocol service request into a service request according to a second protocol and queues said service request making it available for honoring;
   e. an enterprise server responsively coupled to said server which honors said service request and produces a response according to said second protocol;
   f. an input view responsively coupled to said conversion facility which defines conversion of said service request from said CORBA protocol to said second protocol;
   g. an output view responsively coupled to said conversion facility which defines conversion of said response from said second protocol to said CORBA protocol; and
   h. wherein said service request further comprises a request to an XATMI application.

2. The apparatus according to claim 1 wherein said publicly accessible digital data communication network further comprises the World Wide Web.

3. The apparatus according to claim 1 wherein said CORBA protocol service request further comprises IIOP (Integrated Input Output Protocol) protocol.

4. The apparatus according to claim 1 wherein said user terminal further comprises an industry compatible personal computer.

5. A computer implemented method of processing a service request permitting a CORBA (Common Object Request Broker Architecture) user terminal to request services from an enterprise server having XATMI (Extended Application Transaction Module Interface) applications comprising:
   a. composing a CORBA service request in a user terminal;
   b. transmitting said CORBA service request via IIOP (Integrated Input Output Protocol) protocol;
   c. receiving said CORBA service request in a server;
   d. converting said CORBA service request to a second protocol in accordance with an input view defining a format for said conversion;
   e. transferring said converted CORBA service request to an enterprise server;
   f. honoring said converted CORBA service request in said enterprise server;
   g. preparing a response according to said second protocol in said enterprise server;
   h. transferring said response to said server; and
   i. converting said response to CORBA protocol in accordance with an output view which defines said response in said CORBA protocol
   j. transferring said response to said user terminal; and
   k. wherein said CORBA service request further comprises a request to an XATMI application.

6. An apparatus having at least one processor for permitting a CORBA (Common Object Request Broker Architecture) user terminal to request services from an enterprise server having XATMI (Extended Application Transaction Module Interface) applications comprising:
   a. generating means for generating a CORBA service request in IIOP (Integrated Input Output Protocol) protocol;
   b. transferring means responsively coupled to said generating means for transferring of said CORBA service request via a publicly accessible digital data communication network to a server;
   c. converting means responsively coupled to said publicaly accessible digital data communication network for converting said CORBA service request into a second and not compatible protocol in accordance with a definition from an input view;
   d. honoring means responsively coupled to said converting means for honoring said converted CORBA service request, wherein said honoring means further comprises means for producing a response corresponding to said converted CORBA service request and means for transferring said response to said server;
   e. means for converting said response to CORBA protocol in accordance with an output view which defines said response in said CORBA protocol;
   f. means for transferring said response to said user terminal; and
   g. wherein said honoring means further comprises an enterprise server having an XATMI application, and wherein said CORBA service request further comprises a request to said XATMI application.

7. The apparatus according to claim 6 wherein said publicly accessible digital data communication network is the Internet.

8. The apparatus according to claim 7 wherein said honoring means further comprises Unisys 2200 system.

* * * * *